UNITED STATES PATENT OFFICE.

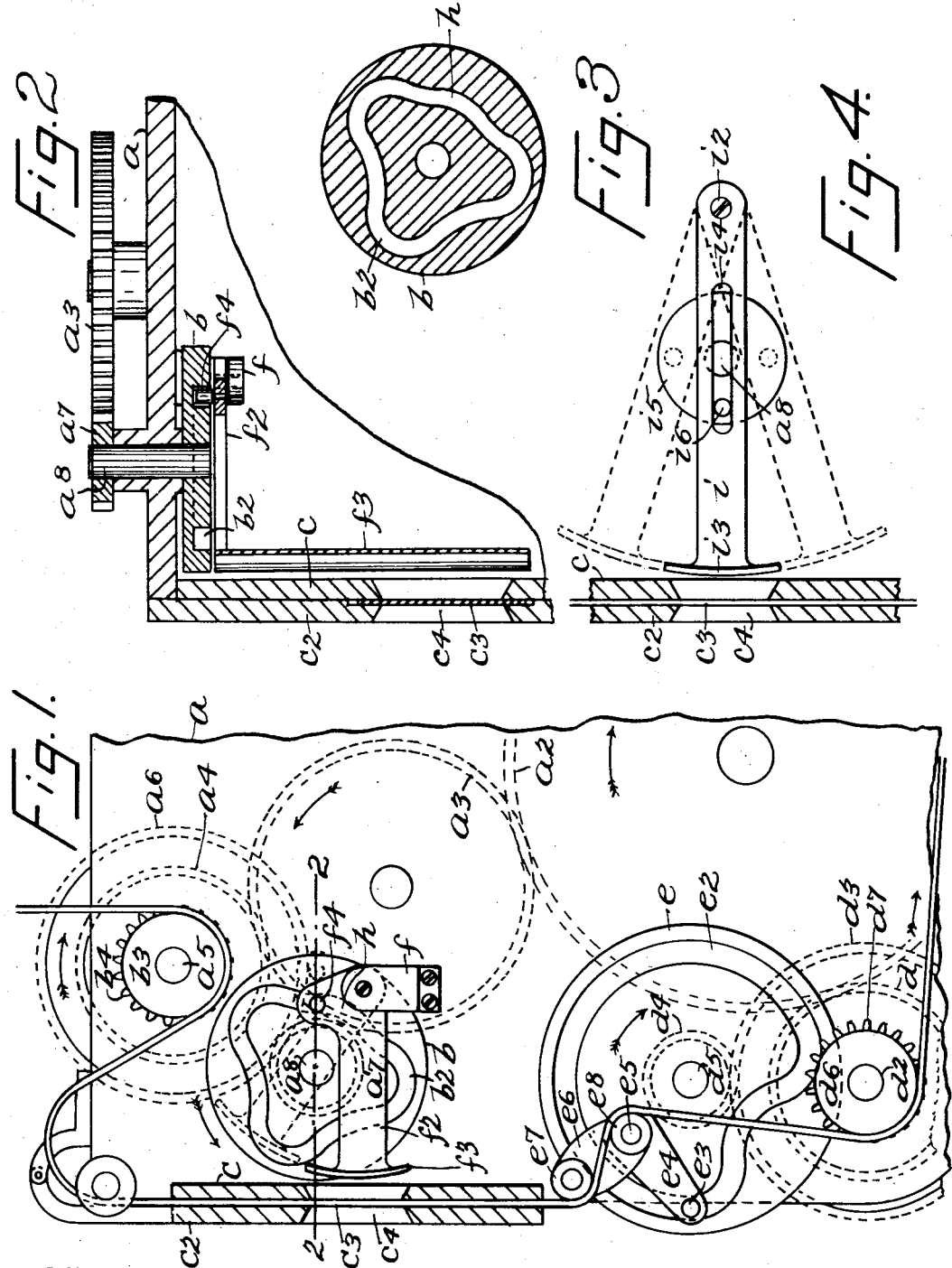

GEORGE W. BINGHAM, OF BROOKLYN, NEW YORK, ASSIGNOR TO THE BINGHAM MANUFACTURING COMPANY, A CORPORATION OF MAINE.

KINETOSCOPE-SHUTTER.

960,793.

Specification of Letters Patent. Patented June 7, 1910.

Application filed April 22, 1908. Serial No. 428,601.

*To all whom it may concern:*

Be it known that I, GEORGE W. BINGHAM, a citizen of the United States of America, and residing at Brooklyn, in the county of Kings and State of New York, have invented certain new and useful Improvements in Kinetoscope-Shutters, of which the following is a specification, such as will enable those skilled in the art to which it appertains to make and use the same.

The present invention relates to moving picture machines, and has more particularly reference to the shutter employed for the purpose of alternately covering and uncovering the exposure opening.

One of the objects of the invention is to arrange the shutter with relation to the bottom edge of the exposure opening in such a manner that the light will be shut off equally entirely across the same—that is, the full width of the exposure opening—this in contradistinction to the effect of the usual rotary shutter or oscillating shutter which moves like one of the jaws of a pair of scissors and cuts off the light on an oblique line.

Another object is to avoid or reduce the flickering effect produced by the present style of shutters.

In carrying out the above objects, the invention comprises the following: The shutter is reciprocated past the exposure opening with its edges parallel to the edges of the exposure opening, thereby cutting off the light equally across the face of said exposure opening. In the form here followed, the shutter is pivoted at right angles to the axis of the exposure opening. The shutter is so timed that it will pass the exposure opening two or more times to each cycle of the machine, one of said movements taking place during the intermittent movement of the film and at relatively the same speed as the movement of the film, and the other of said movements taking place while the film is standing still. The shutter oscillates continuously or substantially so, and the movement of the shutter in opposite directions, may be unequal in speed. In such case as this, the movement of the shutter which coincides with the movement of the film is somewhat slower than that movement of the shutter which takes place when the film is stationary.

Other features of construction will appear as the specification proceeds.

In the accompanying drawings there are illustrated several preferred embodiments of the invention, but it will be understood that various changes and modifications may be made therein without departing from the spirit and scope of the invention.

In the drawings: Figure 1 is a broken detail view of the shutter mechanism and film advancing means of a moving picture machine equipped with my improvements. Fig. 2 is a horizontal sectional view of the shutter cam, taken on the line 2—2 of Fig. 1. Fig. 3 is a sectional view of the shutter cam. Fig. 4 is a detail view of a modified form of the invention.

Similar reference characters denote like parts throughout the several views.

In the machine herein shown, the film passes from the film support around, or partly around the film feeding device $b^3$ on the shaft $a^5$. This film feeding device may be in the form of a sprocket provided with sprocket teeth $b^4$ to engage in the apertures in the edges of the film. The film then passes down across the face of a window member $c$ provided with the usual exposure opening. There may be associated with this window member a door $c^2$ provided with a corresponding exposure opening $c^4$. The film as held between the window member and the door in Fig. 1 is designated $c^3$.

The means illustrated for intermittently advancing the film consists of an advancing roll $e^7$ carried by an oscillating arm $e^6$ on the shaft $e^5$, and a guide roll $e^8$. The advancing roll is oscillated by means of a cam member $e$, having a cam slot $e^2$ therein, which is engaged by a cam roll $e^3$ on the end of an arm $e^4$ fixed on the shaft $e^5$. This cam groove is of a proper shape to intermittently oscillate the film advancing roll to cause said roll to pull the film down past the exposure opening with an intermittent advancing movement. In connection with the film advancing means there is preferably provided a take-up device, here shown in the form of a sprocket $d^6$ on the shaft $d^2$, having teeth $d^7$ for engagement with the perforations in the edges of the film. Motion is imparted to the film advancing means and take-up device by suitable gearing, here shown as a main drive gear $a^2$ meshing with which there is a gear $d$ on the shaft $d^2$, and a gear $d^3$ fixed with respect to the gear $d$ and engaging a pinion $d^4$ on the cam shaft $d^5$.

The form of shutter mechanism illustrated in Fig. 1 consists of an oscillatory arm $f^2$ pivoted to swing upon the bracket $f$ and carrying a shutter blade $f^3$ adapted to coöperate with the exposure opening. The shutter may be oscillated by any suitable means, such as a cam $b$ having a cam slot $b^2$ therein, which is engaged by a projection or cam roll $f^4$ on the shutter carrying arm. This cam is designed to cause a plurality of obscurations during the exposure of each of the pictures. The number of obscurations per picture may vary. In the present instance, three obscurations are produced to each cycle of the machine. For this reason the cam groove, as shown in Figs. 1 and 3, is formed with three high points or outcurves, two of which are equidistant from the other but which are themselves spaced a greater distance apart, and in this greater space between two of the outcurves, there is formed a substantially concentric portion $h$ in the cam groove. Motion may be imparted to the shutter cam and the upper film feeding device by any suitable means, such as a gear $a^3$ in mesh with the main drive gear, and engaging a gear $a^4$ on the sprocket shaft $a^5$, and a gear $a^6$ fixed with respect to the gear $a^4$ and engaging the pinion $a^7$ on the shutter cam shaft $a^8$.

The operation of these parts is as follows: In Fig. 1 the film advancing cam is approaching the position to cause actuation of the film advancing roll, that is, the projection or cam roll $e^3$ is about to enter upon the inwardly curving portion of the cam groove which imparts the downward oscillation to the cam advancing roll. At the same time the concentric portion of the shutter cam is in engagement with the projection or cam roll $f^4$ on the shutter arm. This concentric portion of the cam shutter permits the shutter to remain relatively stationary in the position shown in Fig. 1, to obscure the light during the interval of time in which the film is being advanced to the next picture. The exposure opening is therefore closed during the advancing movement of the film. The high portions of the cam groove cause the shutter arm and shutter carried thereby to be oscillated to the position shown in dotted lines in Fig. 1. As there are three of these outcurves or high portions in the cam, the shutter will be oscillated up and down three times to one exposure of each picture, that is, once during the period of time during which the picture is being positioned with respect to the exposure opening and twice during the actual exposure of the picture and while the picture is relatively stationary.

The invention is capable of many modifications, one of which is illustrated in Fig. 4. Here, as in the first instance, the shutter arm $i$ is pivoted on a center $i^2$ extending substantially at right angles to the plane of the axis of the exposure opening. The shutter arm carries a shutter blade $i^3$ adapted to obscure the exposure opening. In this case the shutter is oscillated to both sides of the exposure opening, that is, up past the exposure opening and down past the exposure opening, instead of, as in the first case, where the shutter is merely oscillated up and down between the exposure opening and a point above the exposure opening. The means for accomplishing this result is illustrated in the form of a crank disk $i^5$ on the shaft $a^8$ and having a crank pin $i^6$ engaging a longitudinal slot $i^4$ in the shutter arm. The movement of the shutter blade up and down both above and below the exposure opening is indicated in dotted lines. The direction of rotation of the crank disk here is the same as the direction of rotation of the shutter cam in Fig. 1. On account of the difference in leverage which the crank pin will exert when it is at the opposite ends of the crank slot, the movement of the shutter downward, that is, in the same direction as the movement of the film, will be comparatively slow as compared to the upward movement of the shutter, when the crank pin is in the position at the inner end of the slot, nearest the point of pivotal support for the arm. The shutter blade is therefore timed to move down with the advancing movement of the film substantially at the same speed as such film, and to move up again past the exposure opening during the exhibition of the picture at a speed greater than the downward movement. In this case there are only two obscurations to each exhibition of the picture, that is, to each cycle of operation of the machine. The shutter moves down to cut off the light during the advancing movement of the film, and then moves upward to again obscure the light and during the exhibition of the picture. This latter movement during the exhibition of the picture is quicker than the obscuration during the advancing movement of the film, but, if found desirable, the shutter could be operated to move at the same relative speed at all times.

It will be noted that in both forms of the invention illustrated, the edge of the shutter blade is disposed parallel to the upper and lower parallel edges of the exposure opening, so that during its up and down movements, the shutter will cut off the light equally across the full width of the picture.

It will be understood, of course, that the invention as a whole and the various features thereof may be applied equally as well to the camera for taking the pictures as to the projecting apparatus for exhibiting the same.

What is claimed, is:

1. In a moving picture machine having an exposure opening, means for intermittently moving the film past the exposure opening, a shutter pivoted at right angles to the axis of the exposure opening, and means for oscillating said shutter past the exposure opening a plurality of times to each cycle of the machine, one of said movements taking place during the downward movement of the film and substantially at the same speed as the movement of the film.

2. In a moving picture machine having an exposure opening, means for intermittently moving the film past the exposure opening, a shutter, means for continuously operating said shutter to move it past the exposure opening a plurality of times to each cycle of the machine but at unequal speeds, the slower one of said movements taking place during the downward movement of the film and at substantially the same speed as the movement of the film.

3. In a moving picture machine having an exposure opening, means for intermittently moving the film past the exposure opening, a shutter, means for continuously reciprocating said shutter to move it past the exposure opening a plurality of times to each cycle of the machine but at unequal speeds, the slower one of said movements being the downward movement and taking place during the advancing movement of the film and at the same speed as the movement of the film.

4. In a moving picture machine having an exposure opening, means for intermittently moving the film past the exposure opening, a shutter pivoted at right angles to the axis of the exposure opening, means for continuously reciprocating said shutter to move it past the exposure opening a plurality of times to each cycle of the machine, but at unequal speeds, the slower one of said movements taking place during the downward movement of the film and at the same speed as the movement of the film.

5. In a moving picture machine having an exposure opening, means for intermittently advancing the film past the exposure opening and adapted to allow the film to remain at rest between such intermittent movements, a shutter arm pivoted at right angles to the axis of the exposure opening, a shutter blade carried by said arm, and means for moving the shutter blade past the exposure opening once during each exposure of the film and once during each movement of the film.

6. In a moving picture machine having a rectangular exposure opening, a shutter arm pivoted at right angles to the axis of the exposure opening, a rectangular shutter blade carried by said arm, with its edges disposed parallel to the edges of the exposure opening and means for oscillating the arm and shutter carried thereby past the exposure opening with a quick movement in one direction and a slower movement in the opposite direction.

7. In a moving picture machine provided with an exposure opening, a shutter arm pivoted at one side of the exposure opening and provided with a slot therein, a shutter blade carried on the end of the shutter arm and standing at right angles to the length of the arm, and a crank disk having a crank pin for engagement with the slot in the shutter arm for imparting oscillation thereto.

8. In a moving picture machine having an exposure opening, means for advancing the film intermittently past the exposure opening, a shutter, pivotally supported at right angles to the axis of the exposure opening, and means for reciprocating said shutter to pass the exposure opening a plurality of times to each cycle of the machine.

9. In a moving picture machine having an exposure opening, means for advancing the film intermittently past the exposure opening, a shutter, and means for reciprocating said shutter to pass the exposure opening a plurality of times to each cycle of the machine, one of said movements of the shutter taking place during the downward stroke of the film advancing means.

10. In a moving picture machine, a plate having an exposure opening therein formed with parallel upper and lower edges, an arm pivoted at right angles to the axis of the exposure opening, a shutter blade carried by said arm and having upper and lower edges parallel to the upper and lower edges of the exposure opening, and operating means connected to the shutter arm adapted to cause the shutter blade to be oscillated past the exposure opening.

11. In a moving picture machine provided with an exposure opening, a shutter arm pivotally supported at one end, a shutter blade carried thereby, and means engaging the arm adjacent the point of pivotal support for actuating the shutter blade to move the same from a point above the exposure opening down past the exposure opening to a point below the same, during each exhibition of the picture.

12. In a moving picture machine provided with an exposure opening, means for intermittently advancing the film past the exposure opening, a shutter associated with the exposure opening, and means for moving said shutter from a point to one side of the exposure opening, to a point to the opposite side of the exposure opening, and then back to the original position, during and between each intermittent movement of the film.

13. In a kinetoscope provided with a light aperture, a shutter comprising a plate, the bottom edge of which is always parallel to the bottom edge of said aperture, an arm secured to said plate and pivoted to said kinetoscope, a disk in operative connection with said arm and means for rotating said disk to oscillate said arm and plate.

14. In a moving picture machine provided with an exposure opening, a shutter arm pivoted at one end and provided with a longitudinal slot therein, a shutter blade carried by the opposite end of the arm, and driving means engaging the slot in the shutter arm at a point adjacent the pivotal support for imparting oscillating movement to the arm.

15. In a moving picture machine having an exposure opening provided with parallel upper and lower edges, a shutter arm provided with a longitudinal slot and pivoted at right angles to the axis of the exposure opening, a shutter blade carried by one end of the shutter arm and having upper and lower edges parallel to the upper and lower edges of the exposure opening, and a crank pin engaging the slot in the shutter arm for imparting as oscillating movement thereto.

16. In a moving picture machine provided with an exposure opening, means for intermittently advancing the film past the exposure opening, a shutter arm pivoted at right angles to the axis of the exposure opening, a shutter blade carried thereby, and means for moving the shutter arm to carry the shutter blade from a point to one side of the exposure opening to a point on the opposite side of the exposure opening at each intermittent movement of the film.

In testimony that I claim the foregoing as my invention I have signed my name in presence of the subscribing witnesses this 21st day of April 1908.

GEORGE W. BINGHAM.

Witnesses:
GEORGE F. BENTLEY,
J. C. LARSEN.